April 3, 1956            J. E. HATULA            2,740,227
ANIMAL TRAP
Filed May 14, 1953                      2 Sheets-Sheet 1
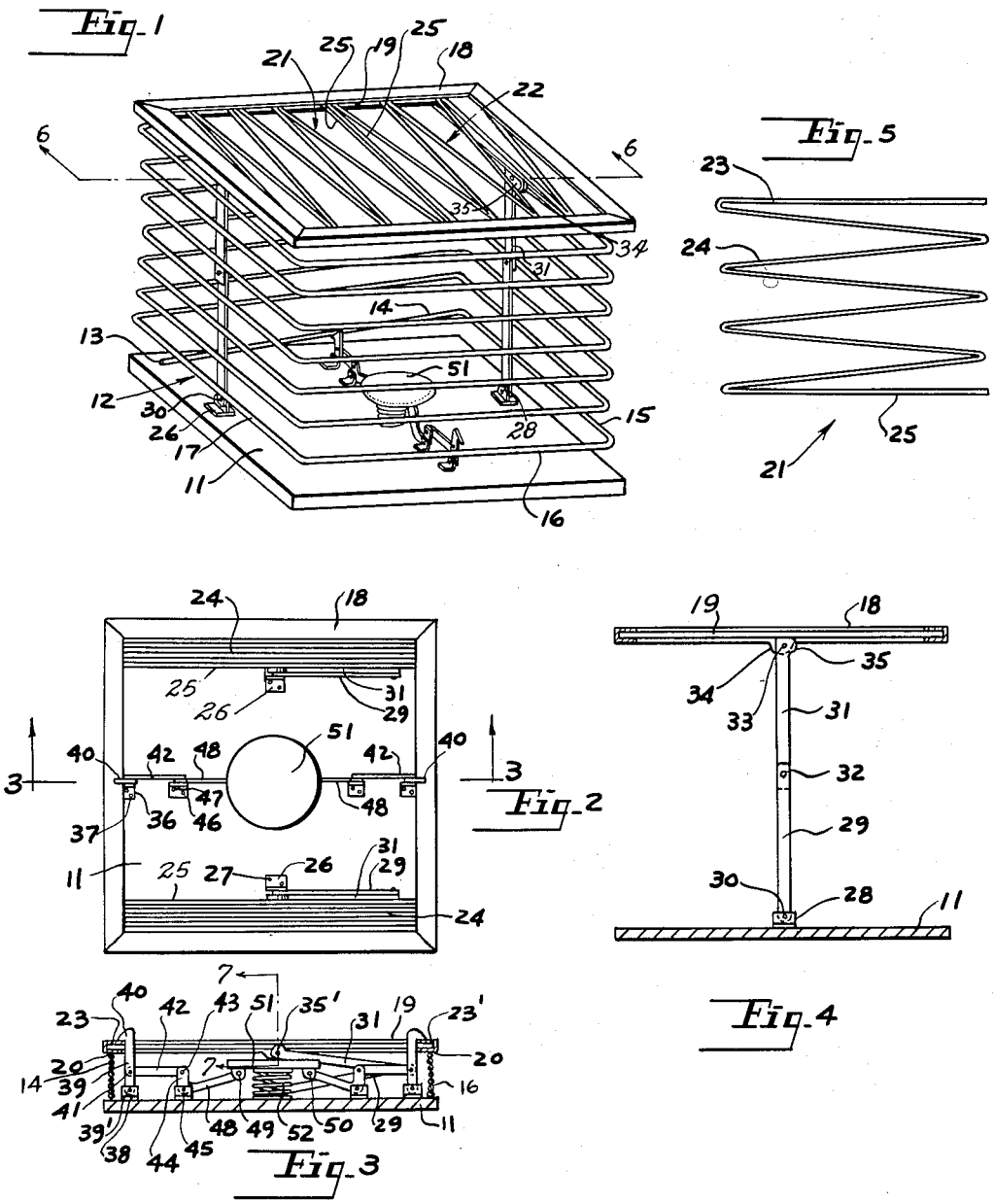
INVENTOR.
JOHN E. HATULA.
BY
Robert A. Sloman
ATTORNEY.

April 3, 1956     J. E. HATULA     2,740,227
ANIMAL TRAP

Filed May 14, 1953     2 Sheets-Sheet 2

INVENTOR.
JOHN E. HATULA.

United States Patent Office 2,740,227
Patented Apr. 3, 1956

2,740,227

ANIMAL TRAP

John E. Hatula, Painesdale, Mich.

Application May 14, 1953, Serial No. 355,069

5 Claims. (Cl. 43—61)

This invention relates to traps, and more particularly to a small animal trap, which completely encloses the trapped animal without harming it.

It is the object of the present invention to provide a simplified trap construction which is inexpensive and easy to manufacture.

It is the further object to provide a trap construction which is light, easy and safe to handle.

It is the further object to provide a collapsible trap construction whereby the trap may be locked in set position to facilitate carrying, shipping and storing.

It is the further object to provide a trap construction which omits the conventional jaw construction of trap, but which is sufficiently collapsible to permit its covering with grass, leaves, sand, snow or water.

It is the still further object of this invention to provide a dual purpose trap for not only catching, but keeping therein the animals caught.

These and other objects will be seen from the following specification and claims in conjunction with the appended drawing, in which:

Fig. 1 is a perspective view of the trap in its released animal enclosing and trapping position.

Fig. 2 is a plan view of the trap in set position with the top closure elements contacted and with the side walls collapsed vertically.

Fig. 3 is a section taken on line 3—3 of Fig. 2.

Fig. 4 is a fragmentary vertical section with parts omitted illustrating the construction of the top closure retaining and releasing elements.

Fig. 5 is a plan view of one of the top closure elements in expanded position.

Figure 6:
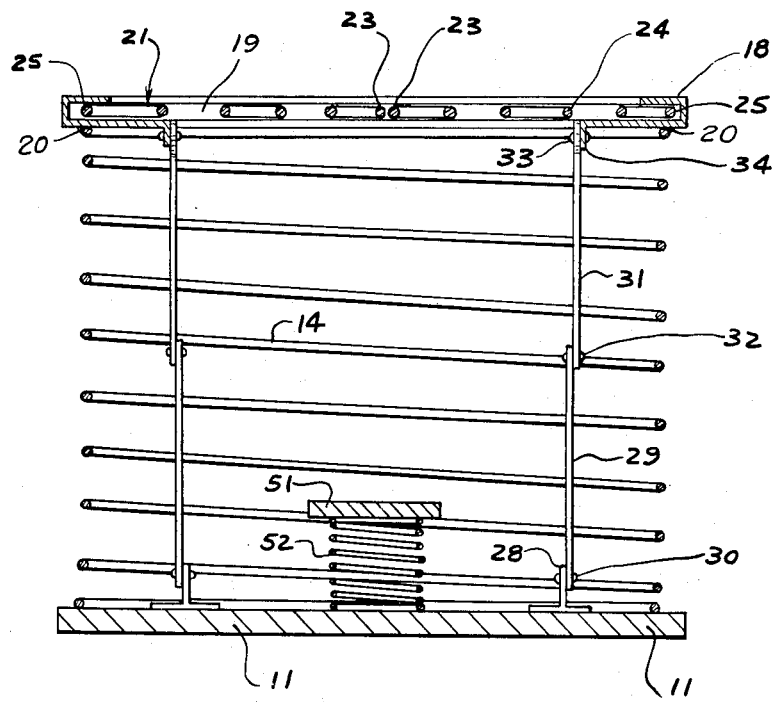
Fig. 6 is a section on an enlarged scale taken substantially on line 6—6 of Fig. 1 with portions of the latch means omitted.

It will be understood that the above drawings illustrate merely a preferred embodiment of the invention, and that other embodiments are contemplated within the scope of the claims hereafter set forth.

Referring to the drawings, the present animal trap and enclosure is shown in released position in Fig. 1, and includes the preferably rectangular supporting platform 11. There is provided upon said platform a hollow upright spring wire enclosure 12, which is anchored at 13 to said platform by any suitable fastener such as a staple, not shown, and is formed from a continuous wire element whose interconnected strands 14, 15, 16 and 17 define one of a plurality of rectangular shaped loops.

The respective substantially rectangularly shaped loops are arranged in vertically spaced relation to each other and interconnected with each other completely forming the side walls of the animal enclosure shown in Fig. 1.

Mounted in a horizontal position upon the top of enclosure 12 is a hollow rectangular frame 18 of channel construction defining the interior slotted guideway 19 within which portions of the top closure elements 21 and 22 are slidably movable.

As shown in Fig. 3, frame 18 is secured to the top strands of the enclosure at points 20, such as by welding.

Each of the top closure elements 21 and 22 is constructed of spring wire and formed into a zigzag shape as shown in Fig. 5.

The top closure elements include the ends 23, which are stationary and are adapted to be anchored or otherwise secured within the opposite ends of frame 18, as at 23' in Fig. 3. Each of the top closure elements 21 also includes the interconnected zigzag elements 24 and the straight end portions 25, the opposite side edges of which are slidably positioned within the channeled slots 19, formed in frame 18.

As shown in Fig. 1, the registering ends 25 of the closure elements are in contact with each other across the central portion of the frame to thereby complete the animal trap and enclosure.

It is contemplated that in order to set the trap, the enclosure 12 is vertically collapsed to the position shown in Figs. 2 and 3, with the respective strands forming said enclosure in close contact with each other, as in Fig. 3. Furthermore, the top closure elements are horizontally and oppositely collapsed with their elements in contact and in registry with each other, as indicated in Fig. 2, to thereby provide a central opening into which the animal to be trapped may step.

The present invention includes mechanism for maintaining the trap in a set position, together with a trigger mechanism operated by the animal upon stepping thereon or otherwise contacting the same, which will automatically release the side walls 14, 15, 16 and 17 of the enclosure, permitting them to resiliently expand to the trap operating position shown in Fig. 1. At the same time, the horizontally collapsed top closure elements are also permitted to resiliently expand to the closure position, shown in Fig. 1, for completely enclosing and restraining the animal. It is contemplated also that birds could be caught in this type of trap.

The mechanism for retaining the top closure elements in retracted set position includes the angle elements 26 secured in spaced relation by fasteners 27 upon opposite sides of platform 11, said angle elements including the upturned portions 28.

Figure 7:
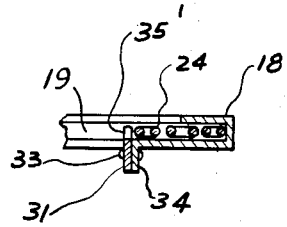
Fig. 7 is a fragmentary sectional view taken substantially on line 7—7 of Fig. 3, illustrating the retractive position of one of the top closure elements.

There are provided a pair of pivotally interconnected folding arms 29 and 31 which are connected to the angle elements 26, one of which is now described. The arm 29 is pivotally connected at its lower end at 30 to angle element 28 and is pivotally joined at 32 at its upper end to the lower end of arm 31. Arm 31 at its upper end is pivotally joined as at 33 to the ear 34, which depends from one side of frame 18, there of course being a corresponding ear 34 opposed from said first ear and arranged upon the opposite side of said frame. Arm 31 at its upper pivoted end has a cam shaped closure retainer 35, which in the collapsed position of enclosure 12, Fig. 3, is seen to project upwardly as at 35' in registry with the slot 19 of the frame 18 and in the path of movement of the ends 25 of the top closure elements 24. Thus with the horizontal closure elements 21 and 22 manually and compressively retracted, the cam elements 35, as positioned at 35' in Figs. 3 and 7 effectively retain said horizontal closure elements in retracted position.

Just as soon as, however, the collapsed enclosure 12 is released, in the manner hereafter described, to move upwardly to the position shown in Figs. 1 and 4, the cam element 35 takes the relative position shown in Fig. 4 disengaging itself from the retracted inner ends 25 of closure elements 21 and 22. These elements are, therefore, permitted to automatically expand to the trap closure position of Fig. 1.

Figs. 1, 2 and 3 illustrate the device which maintains the trap in a set position. For this purpose there are provided upon the opposite sides of platform 11, a pair of angle elements 36 secured as at 37, which have upright portions 38. A locking arm 39 is pivoted at 39' to element 38, and the upper end of said arm has a catch 40, which projects outwardly and is adapted to retainingly overlie the top surface portion of frame 18.

A pair of such arms 39 are provided upon opposite sides of platform 11, which cooperate for retaining the frame 18 in its lowermost position. Horizontally disposed link 42 is pivotally joined at one end at 41 to an intermediate portion of arm 39, and the opposite end of said link is pivotally connected at 43 to the short arm 44 of a cantilever. Said cantilever is pivotally connected at 45 to the angle member 46 secured at 47 to platform 11, there being two angle members 46, indicated in Fig. 2. The long arm 48 of said cantilever is pivotally connected at 49 to the ear 50, which depends from one side of the release disc 51, there of course being a similar depending ear 50 upon the opposite undersurface of said disc as shown in Fig. 3.

Coiled spring 52 is interposed between platform 11 and the undersurface of disc 51, normally urging the same upwardly tending to maintain the frame restraining arms 39 in the position shown in Fig. 3.

In operation, when the animal steps upon disc 51 or otherwise applies a slight downward pressure thereto against the action of spring 52, the short arm 44 of left hand cantilever 48 rotates slightly in a clockwise direction moving link 42 to the right and pivotally disengaging catch 40 of arm 39 from the top surface of frame 18.

It will be noted that both of the opposed catches 40 are simultaneously disengaged from frame 18 and the resiliency in the enclosure 12 closes the same to expand vertically in an instantaneous manner. The upward movement of frame 21 unfolds arms 29 and 31 from the position shown in Fig. 3 to the aligned position of Figs. 1 and 4. This releases the horizontal closure elements 21 and 22, whose inner end portions 25 immediately move towards each other expansively to thereby complete the trapping operation.

Having described my invention, reference should now be had to the claims which follow.

I claim:

1. An animal trap comprising a platform, a hollow upright spring-wire enclosure anchored to said platform and formed from a continuous wire element having vertically spaced interconnected strands defining the four walls thereof, a hollow rectangular channeled frame secured in horizontal position upon the top of said enclosure, a pair of spaced horizontally positioned spring-wire top closure elements of zigzag form anchored at their outer ends within said frame, with their opposite sides movably positioned within the frame channel and their inner ends adapted to be in contact with each other to complete the enclosure, said top closure elements being adapted for opposed horizontal manual retraction to have their inner ends spaced from each other, and said enclosure being adapted for downward manual compressive retraction to permit setting of the trap, stop means pivoted on said frame for retaining the top closure elements in retracted position, means interconnecting said platform and stop means for releasing said stop means, and releasable latching means on said platform normally retaining said enclosure in retracted position.

2. An animal trap comprising a platform, a hollow upright spring-wire expandable and contractable enclosure anchored to said platform and formed from a continuous wire element having vertically spaced interconnected strands defining the four walls thereof, a hollow rectangular channeled frame secured in horizontal position upon the top of said enclosure, a pair of spaced horizontally positioned spring-wire top closure elements of zigzag form anchored at their outer ends within said frame, with their opposite sides movably positioned within the frame channel and their inner ends adapted to be in contact with each other to complete the enclosure, said top closure elements being adapted for opposed horizontal manual retraction to have their inner ends spaced from each other, said enclosure being adapted for downward manual compressive retraction to permit setting of the trap, releasable latching means on said platform for retaining said enclosure in retracted position, means on said platform for releasing the latching means to permit upward expanding movement of said enclosure, stop means interconnecting said platform and frame for retaining said top closure elements in retracted position when said enclosure is retracted, and means on said stop means adapted on upward expanding movement thereof to release said stop means.

3. An animal trap comprising a platform, a hollow upright spring-wire enclosure anchored to said platform and formed from a continuous wire element having vertically spaced interconnected strands defining the four walls thereof, a hollow rectangular channeled frame secured in horizontal position upon the top of said enclosure, a pair of spaced horizontally positioned spring-wire top closure elements of zigzag form anchored at their outer ends within said frame, with their opposite sides movably positioned within the frame channel and their inner ends adapted to be in contact with each other to complete the enclosure, said top closure elements being adapted for opposed horizontal manual retraction to have their inner ends spaced from each other, said enclosure being adapted for downward manual compressive retraction to permit setting of the trap, a pair of spaced releasable latching means pivotally mounted on said platform retainingly engaging opposed portions of said frame for restraining said enclosure in retracted position, means on said platform for releasing the latching means, a pair of spaced stop means pivotally interconnecting said platform and frame upon opposite sides thereof for retaining said top closure elements in retracted position when said enclosure is retracted, and means on said stop means adapted to move upwardly on release of said latching means to release said stop means.

4. An animal trap comprising a platform, a hollow upright spring-wire enclosure anchored to said platform and formed from a continuous wire element having vertically spaced interconnected strands defining the four walls thereof, a hollow rectangular channeled frame secured in horizontal position upon the top of said enclosure, a pair of spaced horizontally positioned spring-wire top closure elements of zigzag form anchored at their outer ends within said frame, with their opposite sides movably positioned within the frame channel and their inner ends adapted to be in contact with each other to complete the enclosure, said top closure elements being adapted for opposed horizontal manual retraction to have their inner ends spaced from each other, said enclosure being adapted for downward manual compressive retraction to permit setting of the trap, a pair of spaced releasable latching means pivotally mounted on said platform retainingly engaging opposed portions of said frame for restraining said enclosure in retracted position, means on said platform for releasing said latching means, two pairs of arms each pair being on opposite sides of said platform within said enclosure, the arms of each pair being pivotally interconnected for relative folding movement, and having their outer ends respectively pivoted to said platform and frame, and cam-shaped elements projecting laterally from the outer ends pivoted to the frame, said cam shaped elements being normally disposed below the frame channel and said top closure elements and adapted upon downward retraction of said enclosure and folding of said arms to project upwardly in registry with said frame channel for retaining said top closure elements in retracted position.

5. An animal trap comprising a platform, a hollow upright spring-wire enclosure anchored to said platform and formed from a continuous wire element having vertically spaced interconnected strands defining the four walls thereof, a hollow rectangular channeled frame secured in horizontal position upon the top of said enclosure, a pair of spaced horizontally positioned spring-wire top closure elements of zigzag form anchored at their outer ends within said frame, with their opposite sides movably positioned within the frame channel and their inner ends adapted to be in contact with each other to complete the enclosure, said top closure elements being adapted for opposed horizontal manual retraction to have their inner ends spaced from each other, said enclosure being adapted for downward manual compressive retraction to permit setting of the trap, a pair of upright spaced releasable latching arms pivotally mounted on said platform at their lower ends, with their upper ends adapted to releasably and restrainingly engage opposed portions of said frame when retracted, spring-biased trigger means spaced above said platform, cantilever means pivotally mounted on said platform with one of their ends pivotally connected to said arms respectively and with their other ends pivotally connected with said trigger means, stop means pivoted on said frame for retaining the top closure elements in retracted position, and means interconnecting said platform and stop means for releasing said stop means.

References Cited in the file of this patent

UNITED STATES PATENTS

| | | |
|---|---|---|
| 700,774 | Holmes | May 27, 1902 |
| 830,284 | Barry | Sept. 4, 1906 |
| 1,187,809 | Broune | June 20, 1916 |
| 1,191,909 | Phillips | July 18, 1916 |
| 1,356,671 | Todoroff | Oct. 26, 1920 |
| 2,123,789 | Miller | July 12, 1938 |
| 2,536,585 | Titus | Jan. 2, 1951 |
| 2,579,128 | Roberg | Dec. 18, 1951 |